(12) United States Patent
Phillips

(10) Patent No.: US 11,469,577 B1
(45) Date of Patent: Oct. 11, 2022

(54) CABLE CUTTER SAW

(71) Applicant: Bruce G. Phillips, Waban, AZ (US)

(72) Inventor: Bruce G. Phillips, Waban, AZ (US)

( * ) Notice: Subject to any disclaimer, the term of this patent is extended or adjusted under 35 U.S.C. 154(b) by 0 days.

(21) Appl. No.: 17/317,083

(22) Filed: May 11, 2021

(51) Int. Cl.
    *H02G 1/12*     (2006.01)
    *B23D 45/04*     (2006.01)
    *B23D 47/04*     (2006.01)
    *B23D 45/12*     (2006.01)
    *B23D 45/10*     (2006.01)

(52) U.S. Cl.
    CPC ......... *H02G 1/1297* (2013.01); *B23D 45/046* (2013.01); *B23D 45/10* (2013.01); *B23D 45/122* (2013.01); *B23D 47/04* (2013.01)

(58) Field of Classification Search
    CPC .. H02G 1/1263; H02G 1/1268; H02G 1/1219; H02G 1/1229; B23D 45/042; B23D 45/12–128; B23D 45/122; B23D 45/046; B23D 45/048; B23D 45/04; Y10S 83/924
    USPC ................. 30/90.2, 90.6, 90.7; 83/862, 863; 81/9.51
    See application file for complete search history.

(56) References Cited

U.S. PATENT DOCUMENTS

| | | | |
|---|---|---|---|
| 967,635 A | 8/1910 | Hewitt | |
| 2,396,442 A * | 3/1946 | Shaver | B23D 45/042 30/91.2 |
| 2,674,027 A | 1/1953 | Kosinski | |
| 2,678,491 A * | 5/1954 | Thomas | H02G 1/1239 30/90.1 |
| 3,057,240 A * | 10/1962 | De Witt | B23D 47/04 83/412 |
| 3,741,061 A * | 6/1973 | Bevacqua | B23D 47/04 83/454 |
| 3,852,917 A * | 12/1974 | McKown | B24B 41/06 451/236 |
| 3,959,877 A * | 6/1976 | Zorzenon | H02G 1/1297 30/91.2 |
| 3,963,763 A | 6/1976 | Hederich et al. | |
| 3,988,826 A * | 11/1976 | Heikkala | B26B 25/005 30/90.9 |
| 4,055,097 A * | 10/1977 | Ducret | B23D 45/122 83/463 |
| 4,103,578 A * | 8/1978 | Ducret | H02G 1/1297 83/924 |
| 4,169,400 A * | 10/1979 | Ducret | H02G 1/1297 83/924 |

(Continued)

*Primary Examiner* — Laura M Lee
(74) *Attorney, Agent, or Firm* — Averill & Green; Kenneth L. Green

(57) ABSTRACT

A metal clad electrical cable saw cuts cable laying in a concave track. A cross-cut saw cuts entirely though the cable making the cable into two cables. Two slitting saws cut outer armor of the cable at two places approximately nine inches from the cross-cut to allow removing the severed outer armor. The two slitting saws cut through one or more overlapping rings of metal that form the outer armor which is of an extruded interlocking design, thereby allowing the outer armor to be removed exposing the electrical wires. Slitting blade guards protect an operator's hands while cutting the cable. The exposed electrical wires may be inserted into an electrical box for connection and the remaining outer armor typically "stops" inside an electrical connector. The connector secures the cable in accordance with applicable practice and code requirements.

17 Claims, 4 Drawing Sheets

(56) References Cited

U.S. PATENT DOCUMENTS

| | | | |
|---|---|---|---|
| 4,548,114 A * | 10/1985 | Sauer | B26D 3/14 |
| | | | 83/692 |
| 4,567,795 A | 2/1986 | Pool | |
| 4,592,253 A * | 6/1986 | Hatfield | H02G 1/1295 |
| | | | 81/9.41 |
| 4,709,610 A | 12/1987 | Pool | |
| 4,730,391 A * | 3/1988 | Wood | H02G 1/1224 |
| | | | 30/90.1 |
| 4,753,144 A | 6/1988 | May | |
| 5,070,615 A * | 12/1991 | Michael, III | H02G 1/1239 |
| | | | 81/9.41 |
| 5,109,899 A | 5/1992 | Hendrickson | |
| 5,176,060 A | 1/1993 | Thornton | |
| 5,692,426 A * | 12/1997 | Alexander | B27G 5/02 |
| | | | 269/295 |
| 5,806,188 A * | 9/1998 | Caraballo | B23D 45/122 |
| | | | 83/924 |
| 6,234,057 B1 | 5/2001 | Vorpahl | |
| 7,140,409 B2 * | 11/2006 | Leberfinger | B23D 45/12 |
| | | | 248/165 |
| 7,159,496 B2 * | 1/2007 | Maes | B23D 47/06 |
| | | | 269/45 |
| 2005/0172769 A1 * | 8/2005 | Maes | B23D 59/007 |
| | | | 83/490 |
| 2006/0090620 A1 * | 5/2006 | Leberfinger | B23D 45/12 |
| | | | 83/490 |

\* cited by examiner

CABLE CUTTER SAW

BACKGROUND OF THE INVENTION

The present invention relates to cutting metal clad electrical cable and in particular to saw which both cuts through the entire cable, and cuts slits in the outer armor separating lengths of the outer armor from the resulting two cable ends exposing wires in the cable.

Cable saws have been in the marketplace for some time. However, existing designs lack critical safety features; documented cases of severe injury (amputation) to operators of previous designs are well documented with OSHA, insurance carriers and have been the basis for product liability litigation and large workman's compensation claims. For example, U.S. Pat. No. 6,234,057 issued May 22, 2001 for "Cable Cutter" describes a cable cutter having a center cutting was for cutting through the cable and two slitting saws for cutting through the out armor, all three saws are attached to a pivoting upper carriage which is lowered to make the required cuts in the cable resting in the V-track. Unfortunately, operators have been seriously injured.

Therefore there remains a need for a cable saw which can be safely used.

BRIEF SUMMARY OF THE INVENTION

The present invention addresses the above and other needs by providing a metal clad electrical cable saw which safely and efficiently cuts cable laying in a concave track. The metal clad electrical cables may be MC-cable, AC cable, BX cable or other types of metal clad electrical cable. A cross-cut saw cuts entirely though the cable making the cable into two cables. Two slitting saws cut outer armor of the cable at two places approximately nine inches from the cross-cut to allow removing the severed outer armor. The two slitting saws cut through one or more overlapping rings of metal that form the outer armor which is of an extruded interlocking design, thereby allowing the outer armor to be removed exposing the electrical wires. Slitting blade guards protect an operator's hands while cutting the cable. The exposed electrical wires may be inserted into an electrical box for connection and the remaining outer armor typically "stops" inside an electrical connector. The connector secures the cable in accordance with applicable practice and code requirements.

In accordance with one aspect of the invention, there is provided a cable saw including a base frame fixed during operation. The base frame may be fabricated from metal tubing or bars and provides support for an upper carriage, a V-track for positioning the cable for cutting, two slitting saws, cross-cut saw retraction arm, and an electrical switch.

In accordance with still another aspect of the invention, there is provided a cable saw including an upper carriage. The upper carriage may be a rectangular shaped support fabricated from metal tubing or bars. It is designed to support and secure a cross-cut saw (for example, a circular saw). The upper carriage is attached to the base frame at two points, at the rear left and rear right. Oil-light or hardened drill bushings are preferably used at the two pivot points.

In accordance with another aspect of the invention, there is provided a cable saw including a cross-cut saw attached to the upper carriage for cutting through the cable. The cross-cut saw is equipped with a factory-included cross-cut blade guard that retracts when the upper carriage is lowered and also includes a cross-cut blade shield in front of the cross-cut blade to prevent any inadvertent operator contact when the cross-cut blade guard is retracted.

In accordance with another aspect of the invention, there is provided a cable saw including spring-loaded slitting blade guards. Only when the operator lowers the upper carriage to cut the cable, are the slitting blade guards depressed exposing the slitting saw blades to cut the outer armor of the cable. The slitting saw blades, turning at approximately 1,000 RPM, are not exposed to the operator before cutting because the slitting blade guards block exposure, or during cutting because the cable covers the slitting saw blades. When the upper carriage is returned to its raised position, the slitting blade guards spring back vertically to cover the slitting saw blades.

In accordance with still another aspect of the invention, there is provided a cable saw upper carriage including cable hold downs. The hold downs may be flat or include a radius where the hold down engages the cable which helps center the cable on the slitting saw blades. When the upper carriage is lowered by the operator, the cable hold downs engage the cable. With additional lowering of the carriage, and downward force exerted by the operator, the cable hold downs push down on the cable thereby depressing slitting blade guards downward into a V-shaped "track." With continued pressure, until the springs under the slitting blade guards are partially collapsed, the slitting saws are forced into the outer armor from underneath thereby completing the slitting operation. The cable hold downs are preferably attached with bolts and slide through two hardened bushings. The cable hold downs may be fixed and adjustable or may include springs. When springs are present, when the upper carriage is returned to its starting position and the cable hold downs return to their starting position as the springs expand back to their non-compressed length. Bolt length and spring selection have been optimized to ensure optimal pressure on the cable when the operator lowers the upper carriage. The feet may also be fixed without the use of springs and adjusted up/down to accommodate for varying cable diameters.

In accordance with still another aspect of the invention, there is provided a cable saw having a built in electrical switch. The cross-cut saw, and the two slitting saw motors, are only energized by the electrical switch when the upper carriage is lowered and then turn off when the upper carriage is raised.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1A:
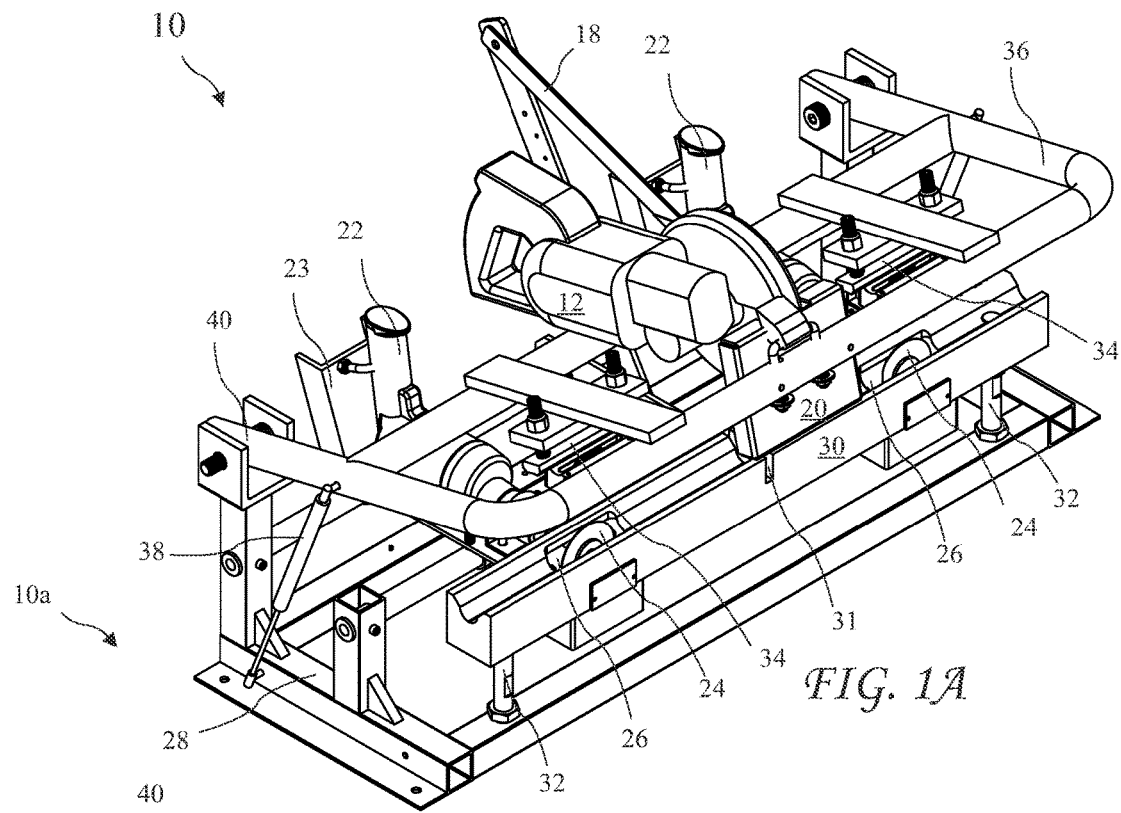
FIG. 1A is a left side top view of a cable saw according to the present invention.
Figure 1B:
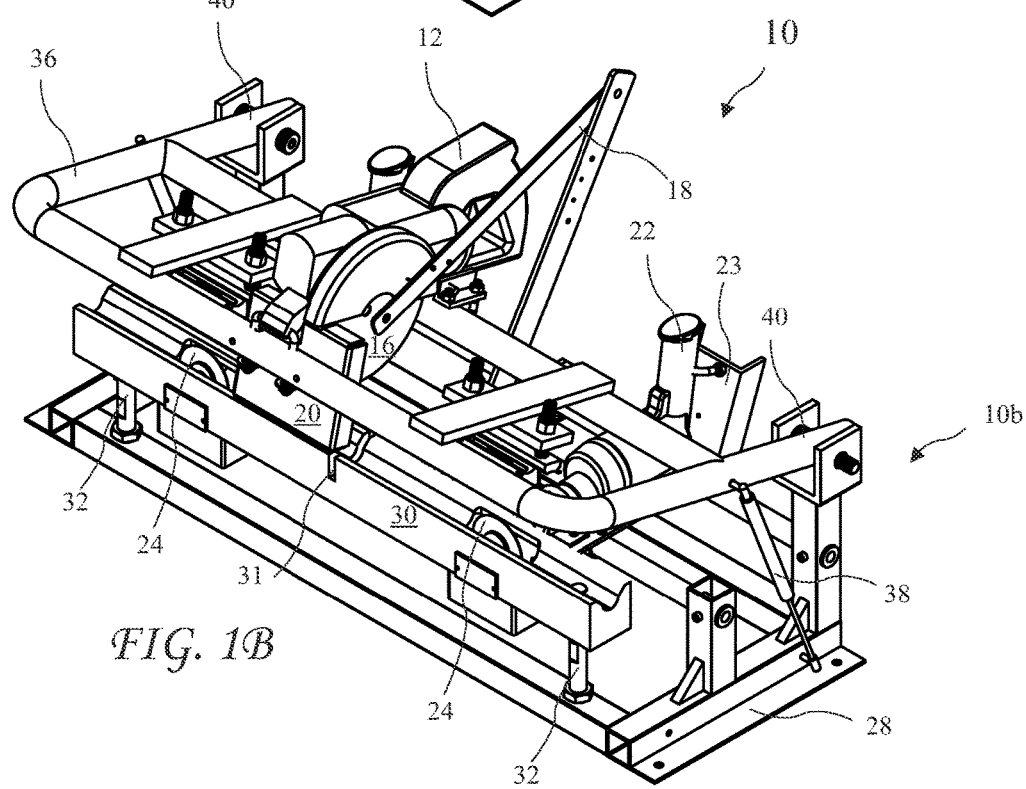
FIG. 1B is a right side top view of the cable saw according to the present invention.

A left side 10a top view of a cable saw 10 according to the present invention is shown in FIG. 1A and a right side 10b top view of the cable saw 10 is shown in FIG. 1B. The cable saw 10 includes a moving, preferably pivoting, upper carriage 36 preferably attached to a base 28 at upper carriage pivots 40, and the base 28 fixed during use. A cable saw, generally a common circular saw 12, is fixed to the upper carriage 36 and is lowered against metal clad electrical cable 42 (see FIG. 3A) to cut through the cable 42. The cable 42 may be MC-cable, AC cable, BX cable or other types of metal clad electrical cable. Two slitting saw motors 22 are attached to the base 28 by slitting saw motor supports 23 and include slitting saw blades 24 for cutting through at least one ring 48 of outer armor 44 (see FIG. 3B) of the cable 42, allowing a portion of the outer armor to be removed after cutting through the at least one ring 48 of the cable 42. The cross-cut saw 12 is laterally (between the left side 10a and the right side 10b) centered in the cable saw 10. The slitting saw motors 22 are preferably located between 12 and 24 inches apart, and m ore preferably 18 inches apart. The upper carriage 36 is supported by upper carriage support struts 38 which urge the upper carriage 36 up a highest position when not in use or after each cut operation.

The cable saw 10 further includes a V-track (or concave track) 30 reaching laterally between the sides 10a and 10b proximal to the sides 10a and 10b for positioning the cable 42 for cutting. The V-track 30 has a concave top and reaches across the cable saw 10 for receiving the cable 42. The V-track 30 is preferably between 18 and 36 inches long, and more preferably 30 inches long. The V-track 30 may also be 12 inches wider than the separation of the slitting saws 22. Two slitting saw guards 26 (see FIGS. 4A-6D) reside in the V-track 30 and have slots 52 aligned with slitting saw blades 24. A cross-cut saw groove 31 generally centered in the V-track is aligned with the cross-cut saw blade 14 (see FIG. 2B). The V-track 30 is supported by V-track supports 32 which may be adjustable to fixed positions. For example the V-track supports 32 may include a top thread is left-handed and the bottom thread is right handed. This allows for the assembly and fine-adjusting of the slitting saw depth of cut. Cable hold downs 34 attached to the upper carriage 36, bear against the cable 42 resting in the V-track and when the operator lowers the upper carriage 36. The V-track 30 includes walls 60 reaching down to a rounded bottom 62.

The cable hold downs 34 maybe fixed, fixed and adjustable, spring loaded, or spring loaded and adjustable. In one embodiment, the slitting saw motor supports 23 are fixed to the base 28 and provide a nine inch armor cut length. The armor cut length could be modified by lengthening the slitting saw blade guards 26 making the opening wider. The slitting saw motor supports 23 may be attached to two shafts and can be moved closer, or farther from the cross-cut saw 12 if a customer wanted to be able to vary the lengths of the armor being removed from the ends A cross-cut blade 14 is protected by a cross-cut blade guard 16 when not in use. When an operator lowers the upper carriage to cut cable, a cross-cut blade guard retractor 18 retracts the cross-cut blade guard 16. A cross-cut blade shield 20 further protects the operator from the cross-cut blade 14.

Figure 2B:
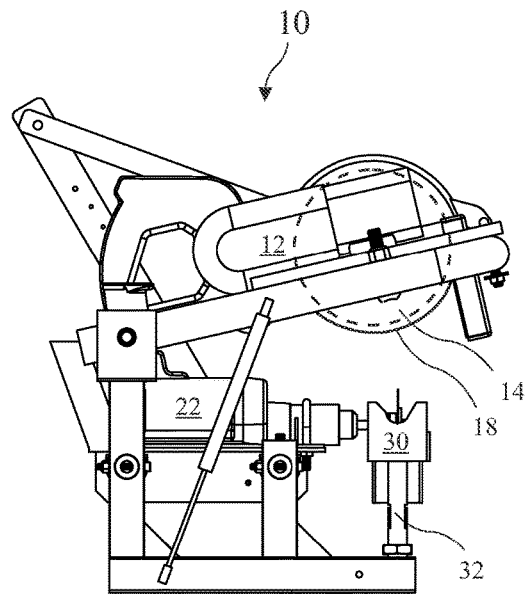
FIG. 2B is a left side view of the cable saw according to the present invention.
Figure 2C:
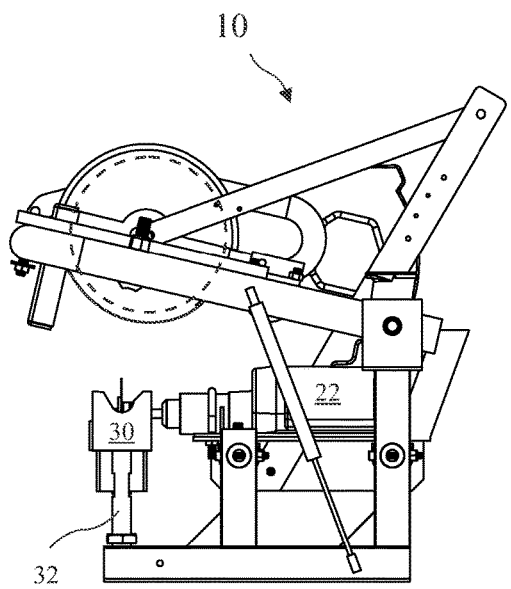
FIG. 2C is a right side view of the cable saw according to the present invention.
Figure 2A:
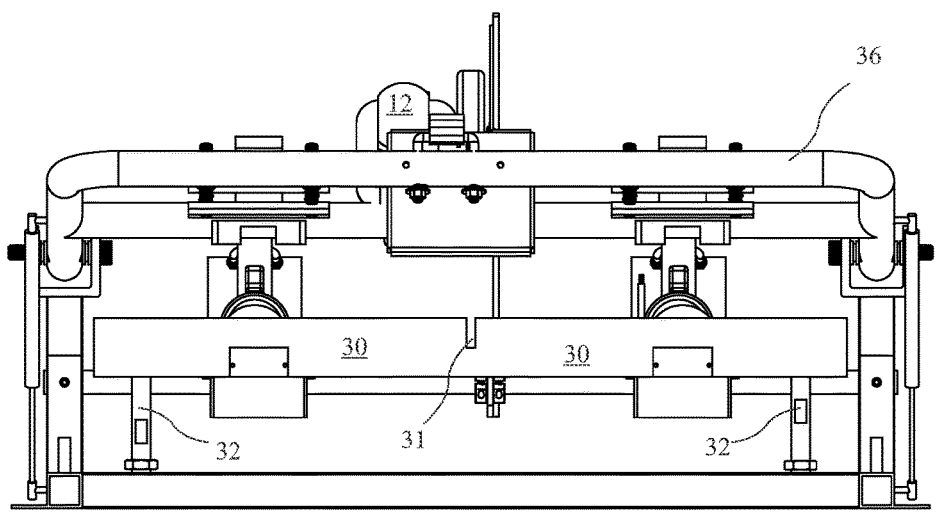
FIG. 2A is a front view of the cable saw according to the present invention.

A front view of the cable saw 10 is shown in FIG. 2A, a left side view of the cable saw 10 is shown in FIG. 2B, and a right side view of the cable saw 10 is shown in FIG. 2C. The cross-cut blade 14 residing behind the blade guard 16 is shown in dashed lines in FIG. 2B.

Figure 3A:
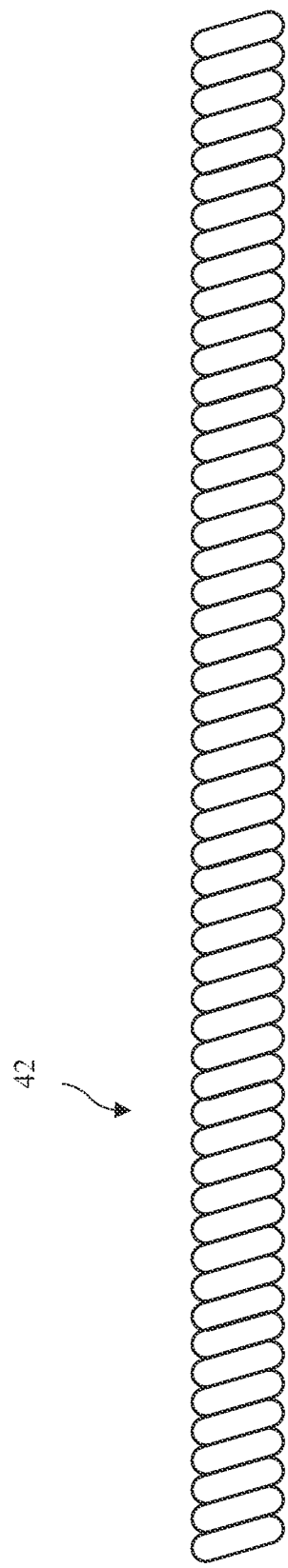
FIG. 3A shows a cable before cutting.
Figure 3B:
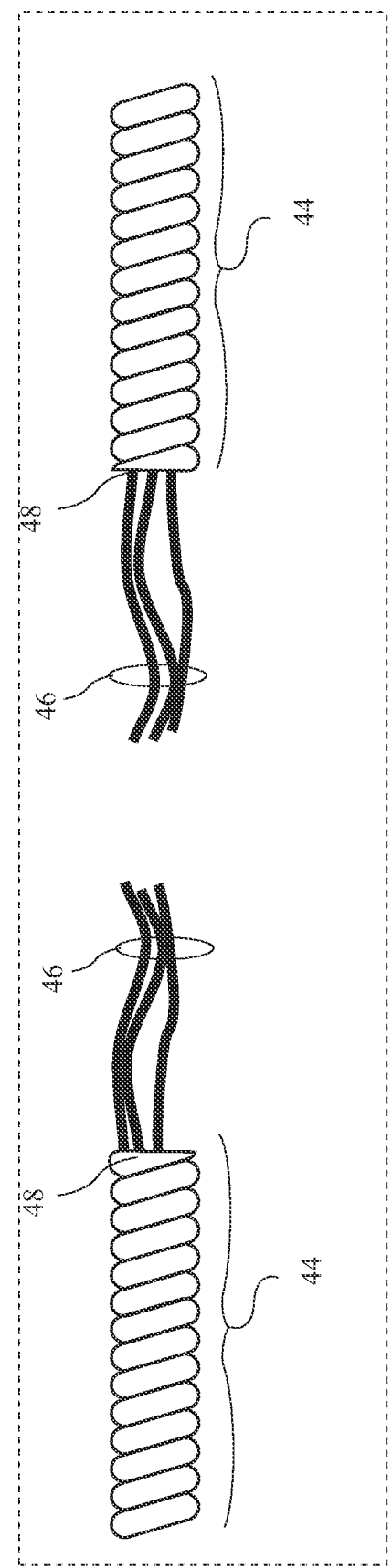
FIG. 3B shows the cable after cutting according to the present invention.

The cable before cutting is shown in FIG. 3A and the cable after cutting is shown in FIG. 3B.

Figure 4B:
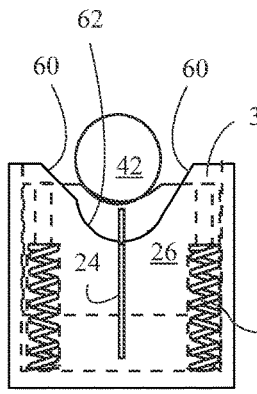
FIG. 4B shows an end view details of the slitting blade guard residing in the V-track before pushing the cable down for cutting, according to the present invention.
Figure 4A:
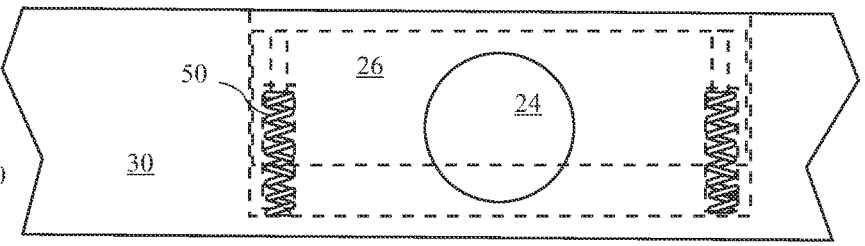
FIG. 4A shows a side view details of the slitting blade guard residing in the V-track before pushing the cable down for cutting, according to the present invention.
Figure 4C:
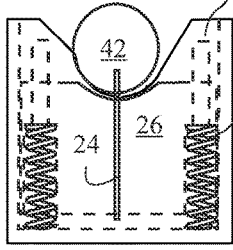
FIG. 4C shows an end view details of the slitting blade guard residing in the V-track after pushing the cable down for cutting, according to the present invention.

Side view details of the slitting blade guard 26 residing in the V-track 30 before pushing the cable 42 down for cutting, is shown in FIG. 4A, end view details of the slitting blade guard 26 residing in the V-track 30 before pushing the cable 42 down for cutting are shown in FIG. 4B, and end view details of the slitting blade guard residing in the V-track after pushing the cable down for cutting, are shown in FIG. 4C. Springs 50, preferably four springs 50, urge the slitting blade guard 26 up to protect the operator from the slitting saw blades 24 (see FIGS. 1A and 1B) before and after cutting the cable. The slitting saw blade 24 is shown below the cable 42 in FIG. 4B and cutting into the cable 42 in FIG. 4C.

Figure 5:
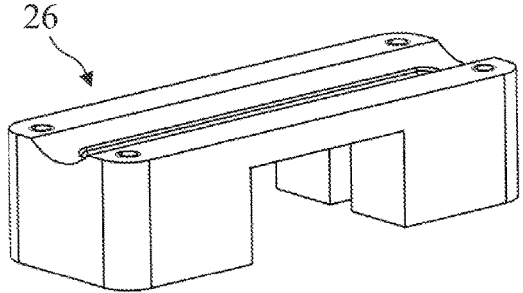
FIG. 5 shows a perspective view of the slitting blade guard according to the present invention.
Figure 6C:
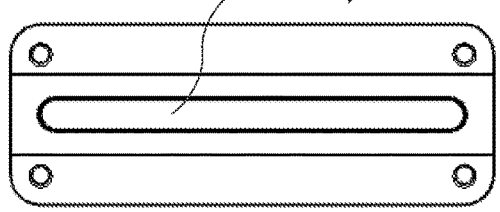
FIG. 6C shows a top view of the slitting blade guard according to the present invention.
Figure 6B:
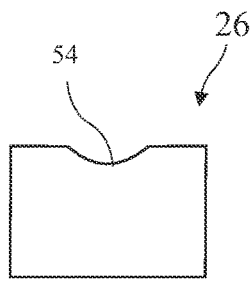
FIG. 6B shows an end view of the slitting blade guard according to the present invention.
Figure 6A:
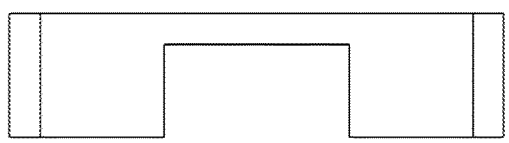
FIG. 6A shows a side view of the slitting blade guard according to the present invention.
Figure 6D:
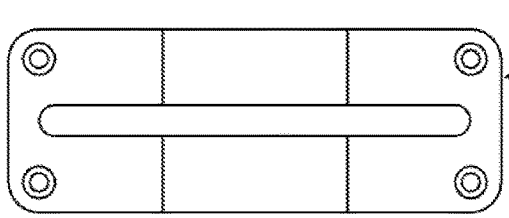
FIG. 6D shows a bottom view of the slitting blade guard according to the present invention.

A perspective view of the slitting blade guard 26 is shown in FIG. 5, a side view of the slitting blade guard 26 is shown in FIG. 6A, an end view of the slitting blade guard 26 is shown in FIG. 6B, a top view of the slitting guard 26 is shown in FIG. 6C, and a bottom view of the slitting blade guard 26 is shown in FIG. 6D.

While the invention herein disclosed has been described by means of specific embodiments and applications thereof, numerous modifications and variations could be made thereto by those skilled in the art without departing from the scope of the invention set forth in the claims.

I claim:

1. A metal clad electrical cable cutting saw, comprising:
   a base having a base right side and a base left side;
   a concave track fixed to the base during use and reaching laterally from proximal to the base left side to proximal to the base right side;

two slitting saws attached to the base and having slitting blades;
slots in the concave track exposing the slitting blades for cutting outer armor of the cable;
an upper carriage moveably attached to the base; and
a cross-cut saw attached to the upper carriage and having a cross-cut blade generally perpendicular to the concave track,
wherein the upper carriage has a raised position allowing the cable to be placed in the concave track, and a lowered position wherein the cutting blade completely overlaps the cable and the slitting blades completely overlap at least one ring of outer armor of the cable.

2. The cable cutting saw of claim 1, further including slitting blade guards residing in the concave track, the slots in the concave track are in the slitting blade guards, the slitting blade guards having:
a first guard position wherein a top surface of the slitting blade guards resides above the slitting blades; and
a second guard position wherein the slitting blade guards are depressed exposing enough of the slitting blades through the slots to completely overlap the at least one ring of the outer armor of the cable.

3. The cable cutting saw of claim 1, further including cable hold-downs attached to the upper carriage and overlapping the concave track, the cable hold-downs in intimate contact with the cable, and cable in intimate contact with the concave track, in the lowered position of the upper carriage.

4. The cable cutting saw of claim 3, wherein the cable hold-downs are adjustable to a fixed position.

5. The cable cutting saw of claim 3, wherein the cable hold-downs are urged towards the concave track by springs.

6. The cable cutting saw of claim 1, wherein the upper carriage pivots with respect to the base.

7. The cable cutting saw of claim 1, wherein support struts urge the upper carriage towards the raised position.

8. The cable cutting saw of claim 1, wherein in the concave track is vertically adjustable with respect to the base.

9. The cable cutting saw of claim 1, wherein the slots in the concave track are between 12 and 24 inches apart.

10. The cable cutting saw of claim 9, wherein in the concave track is between 18 and 36 inches long.

11. The cable cutting saw of claim 9, wherein the slots in the concave track are about 18 inches apart.

12. The cable cutting saw of claim 11, wherein in the concave track is about 30 inches long.

13. The cable cutting saw of claim 1, further including a cross-cut blade guard retractor attached to the base and including an arm attached to the cross-cut blade guard and pivoting a cross-cut blade guard when the upper carriage is lowered.

14. The cable cutting saw of claim 1, further including a cross-cut blade groove in the concave track, the groove allowing the cross-cut blade to entirely cut through the cable.

15. The cable cutting saw of claim 11, wherein in the concave track includes "V" shaped walls reaching down into the concave track to a rounded bottom.

16. A metal clad electrical cable cutting saw, comprising:
a base having a base right side and a base left side;
a concave track fixed to the base during use and reaching laterally from proximal to the base left side to proximal to the base right side;
two slitting saws attached to the base and having slitting blades;
the concave track includes slitting blade guards, the slitting blade guards having:
a first guard position wherein a top surface of the slitting blade guards resides above the slitting blades; and
a second guard position wherein the slitting blade guards are depressed exposing enough of the slitting blades through slots in the slitting blade guards to completely overlap at least one ring of outer armor of the cable;
an upper carriage moveably attached to the base;
a cross-cut saw attached to the upper carriage and having a cross-cut blade generally perpendicular to the concave track; and
a cross-cut blade guard retractor attached to base and including an arm attached to the cross-cut blade guard and pivoting the cross-cut blade guard when the upper carriage is lowered,
wherein the upper carriage has a raised position allowing the cable to be placed in the concave track, and a lowered position wherein the cutting blade completely overlaps the cable and each of the slitting blades completely overlap the at least one ring of outer armor of the cable.

17. A metal clad electrical cable cutting saw, comprising:
a base having a base right side and a base left side;
a vertically adjustable concave track between 18 and 36 inches long and fixed to the base during use and reaching laterally from proximal to the base left side to proximal to the base right side;
two slitting saws attached to the base and having slitting blades;
the concave track includes slitting blade guards between 12 and 24 inches apart, the slitting blade guards having:
a first guard position wherein a top surface of the slitting blade guards resides above the slitting blades; and
a second guard position wherein the slitting blade guards are depressed exposing enough of the slitting blades through slots in the slitting blade guards to completely overlap at least one ring of outer armor of the cable;
an upper carriage moveably attached to the base;
a cross-cut saw attached to the upper carriage and having a cross-cut blade generally perpendicular to the concave track; and
a cross-cut blade guard retractor attached to base and including an arm attached to the cross-cut blade guard and pivoting the cross-cut blade guard when the upper carriage is lowered,
wherein the upper carriage has a raised position allowing the cable to be placed in the concave track, and a lowered position wherein the cutting blade completely overlaps the cable and each of the slitting blades completely overlap the at least one ring of outer armor of the cable.

* * * * *